United States Patent [19]

Rosenberg et al.

[11] Patent Number: 4,479,874

[45] Date of Patent: Oct. 30, 1984

[54] CONVOLUTED PLURAL LAYER FILTER ASSEMBLY

[75] Inventors: David J. Rosenberg, Glen Head; Vlado I. Matkovich, Glen Cove, both of N.Y.

[73] Assignee: Pall Corporation, Glen Cove, N.Y.

[21] Appl. No.: 422,238

[22] Filed: Sep. 23, 1982

[51] Int. Cl.³ ............................................. B01D 29/06
[52] U.S. Cl. .................................. 210/445; 210/446; 210/487; 210/492; 210/494.1; 55/521
[58] Field of Search ............... 210/445, 446, 449, 487, 210/494.1, 494.2, 494.3, 493.1, 493.2, 493.3, 493.4, 493.5, 335, 314, 315, 489, 491, 492; 55/497, 498, 521, 159

[56] References Cited

U.S. PATENT DOCUMENTS

| | | | |
|---|---|---|---|
| 973,723 | 10/1910 | Thomson | 210/445 |
| 1,861,576 | 3/1926 | Liddell | 210/494.1 |
| 2,647,637 | 8/1953 | Leet | 210/494.1 |
| 3,701,433 | 10/1972 | Krakauer et al. | 210/457 |
| 3,815,754 | 6/1974 | Rosenberg | 210/445 |
| 4,148,732 | 4/1979 | Barrow et al. | 210/446 |
| 4,187,182 | 2/1980 | Rosenberg | 210/445 |
| 4,271,025 | 6/1981 | Erdmannsdorfer | 210/493.2 |

FOREIGN PATENT DOCUMENTS 292719 6/1928 United Kingdom ............ 210/493.1

Primary Examiner—Richard V. Fisher
Assistant Examiner—John W. Czaja

[57] ABSTRACT

A filter assembly is provided comprising a housing; a fluid inlet and a fluid outlet in the housing, each opening into a fluid chamber; and, disposed in the fluid chamber across the line of fluid flow from the inlet to the outlet so that all flow from the fluid inlet to the fluid outlet must pass therethrough, a filter element composite comprising a filter sheet material sandwiched between layers of foraminous spacer sheet material. The filter element composite has an upstream side and a downstream side and separates the chamber into a first portion on one side of the filter element composite communicating with the fluid inlet, and a second portion on the other side of the filter element composite communicating with the fluid outlet. The filter element composite is folded on itself in at least a double layer defining therebetween an open interior space in fluid communication with one of the first and second portions of the fluid chamber, the outer side of the filter element composite being in fluid communication with the other of the first and second portions of the fluid chamber; and the double layer filter element composite is arranged in a plurality of convolutions extending transversely across the fluid chamber back and forth across the line of fluid flow from the fluid inlet to the fluid outlet.

14 Claims, 6 Drawing Figures

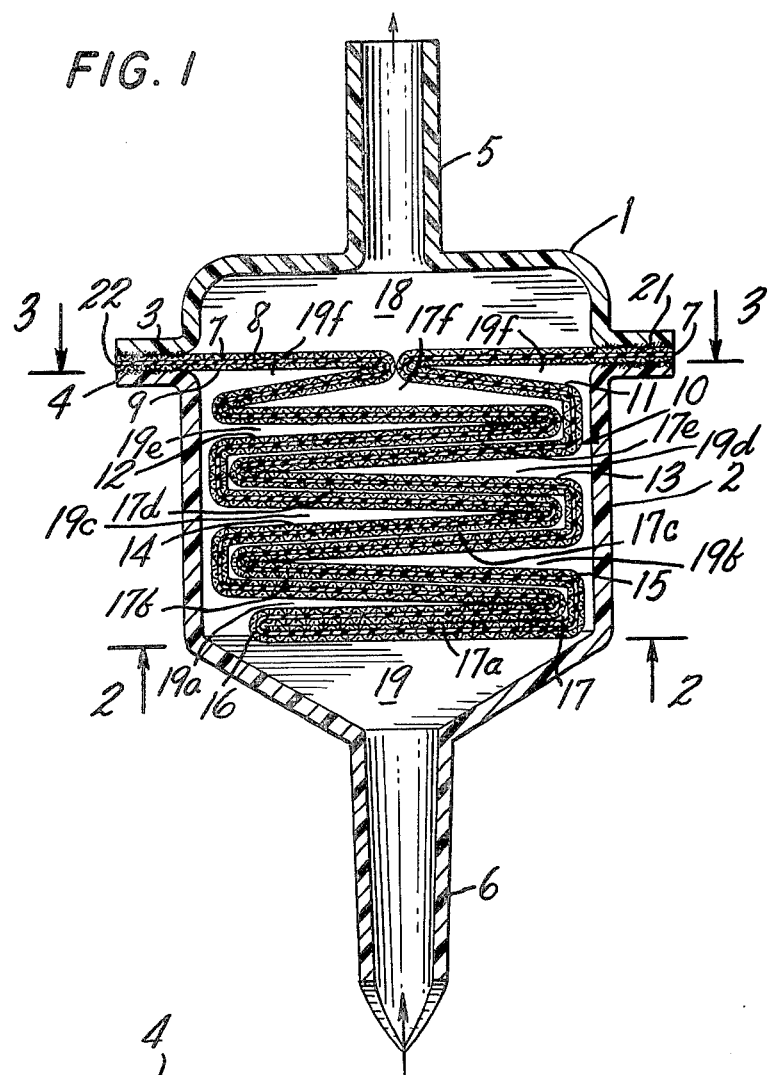
FIG. 1
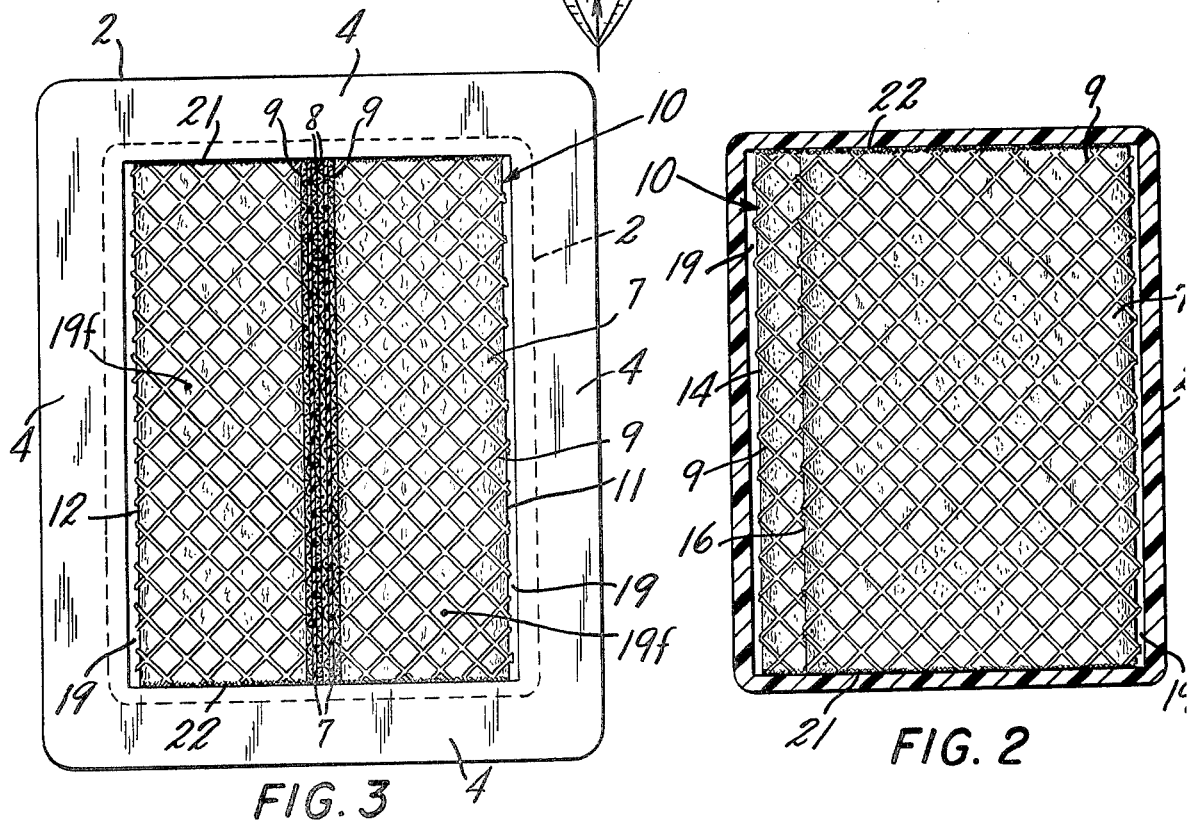
FIG. 3
FIG. 2

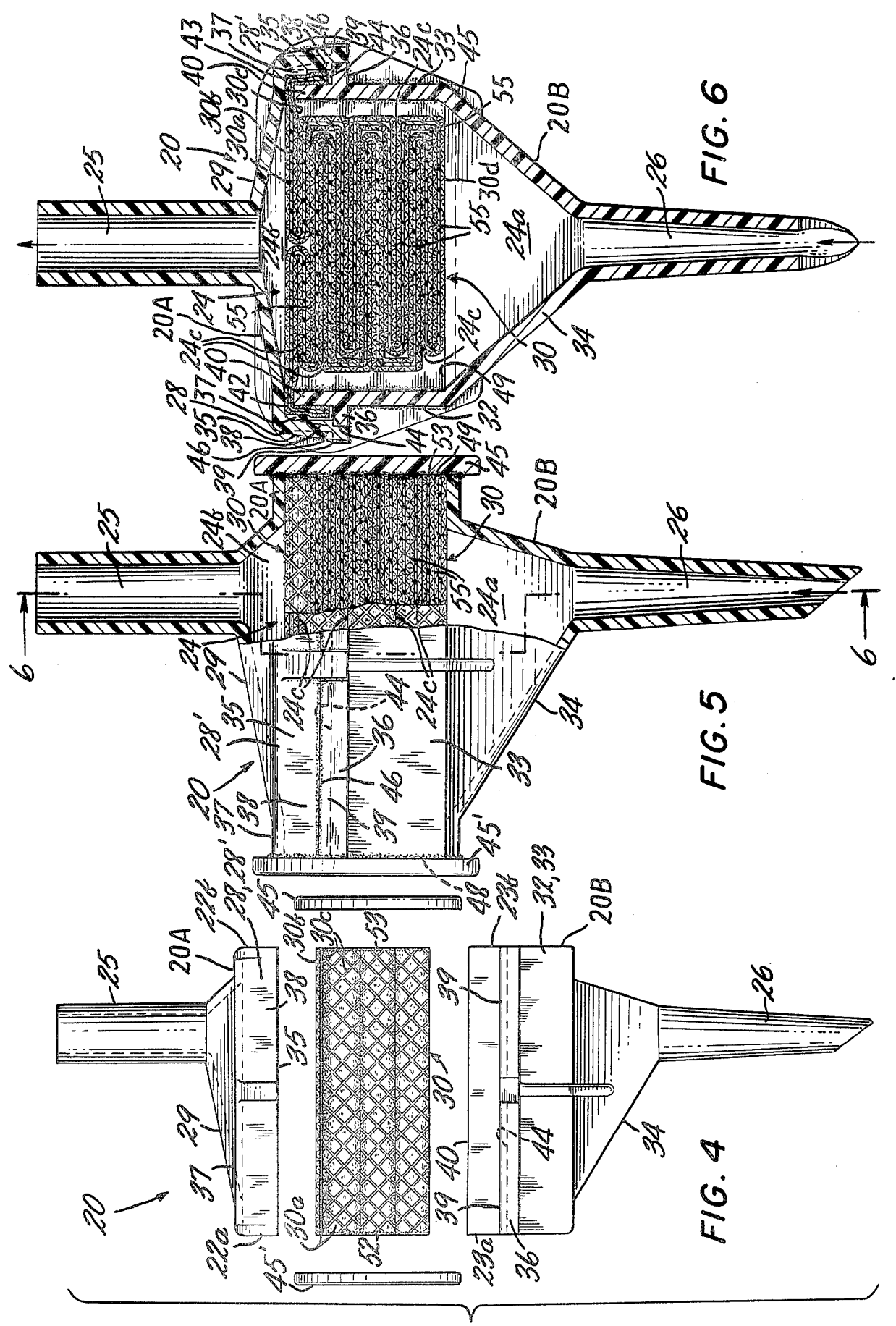

CONVOLUTED PLURAL LAYER FILTER ASSEMBLY

Filter elements normally include a housing having a fluid inlet and a fluid outlet, with a filter sheet material disposed in the housing across the line of fluid flow from the inlet to the outlet, in a manner such that all fluid flow therebetween must pass through the filter sheet material. In order to provide as much surface area of filter sheet material in a limited space as possible, the filter sheet material is normally folded in a plurality of corrugations. Fluid flow proceeds from the upstream side of the filter sheet material directly through the filter sheet material at some part of the surface of each corrugation fold, to the downstream side of the filter material, whence it proceeds to the fluid outlet. There is accordingly normally only one pass of the fluid through the filter sheet material. If a number of passes through a filter sheet material are required, a number of layers of filter sheet material must be provided.

It is accordingly common practice to include in the filter element a number of layers of filter sheet material of the same or differing pore size, arranged in series, usually with any coarser layer upstream, and the finer layer downstream, so that the coarse layer removes the larger particles first, and the finer layer the smallest particles. This prolongs the life of the finer layer, since the larger particles are screened out before they can reach this layer.

While multilayer filter sheet material composites are frequently employed in filter elements, the several layers usually have to be spaced apart so as to provide room for accumulation of the particular particle size contaminants screened out by each layer. Multilayer filter assemblies are described for example in U.S. Pat. Nos. 3,765,536, patented Oct. 16, 1973, and 3,765,537, patented Oct. 16, 1973, to David Rosenberg, while a single layer filter element using one of the layers of these two patents is described in U.S. Pat. No. 3,701,433, patented Oct. 31, 1972, to David Rosenberg.

However, there is no way to make uniform the degree of utilization of each of the several layers, so that normally the multilayer assemblies do not have a life that is extended by a factor equal to the members of layers multiplied by the normal life of each layer, as might be expected. The functional burden of contaminant removal is still on the finest layer. The total life of the multilayer assembly is actually no greater than the life of the layer that happens to become plugged the first, and this is normally the finest layer. The result is that the life for the multilayer assembly may be only slightly longer than that of the finest layer.

It is not advantageous from the standpoint of extended life in a multilayer assembly to use a filter material of the same pore size for each layer, since in such an assembly the layers downstream of the first layer serve no more than as backups for the first layer, in case of rupture or other fault in the first layer.

The present invention obtains an extended life and a more efficient contaminant removal utilizing only one more filter layer, based on an entirely different approach, namely, compeling the fluid to pass through the same filter sheet not once but several times on its way through the filter assembly. A multipass effect is obtained, as in a multiple layer filter assembly, but without the necessity of providing several layers plus the collection space between several layers. Moreover, the multiple passes are obtained without having to utilize coarser materials upstream of the final filter layer, to provide for a selective separation and accumulation of contaminants, and thus prolong the life of the final layer. The normal space for accumulation of contaminants on the upstream side of the filter sheet composite through which several passes are made is quite sufficient.

How to achieve several passes of fluid through the same filter element without recycling effluent filtrate to the filter assembly has heretofore eluded the art. In the available filter cartridge assemblies, the filter cartridge is placed across the line of flow, but whether the filter element is flat or corrugated, the filter element surface is so placed that the fluid flow for the most part passes along the filter surface or at a small angle thereto, normally less than 45°, and must execute a turn at an angle of up to 90° to pass through the filter itself. In the usual arrangement of a corrugated filter cartridge, for example, the upstream flow passes along the surface of the corrugations and into the corrugation folds.

In the filter element structure of the present invention, the corrugation folds are formed by folding a filter sheet composite upon itself as a double layer, and then folding the double layer on itself in a plurality of corrugation folds arranged transversely across and at an angle of at least 60° up to 90° to the line of fluid flow, so that the fluid flow may proceed all the way across the double layer of not one but several such convolutions, thus passing through the filter element several times, en route to the fluid outlet. In so doing, there are at least two passes and, depending upon the number of convolution folds, as many as twenty passes, through the filter element itself.

The surprising result of these multiple passes through the same filter element is a remarkably enhanced contaminant removable rating, well below that normal for a filter element of that pore size. A relatively coarse filter element having a nominal removal rating of, say, 40 microns, when folded and convoluted in the filter structure of the invention may exhibit a removal rating as low as 15 microns, and normally as low as 20 microns. This is a remarkable result, and means that in the filter structures of the invention a much coarser filter material can be used than might otherwise be possible. This makes possible an increased flow rate for the removal rating since the filter is coarser, with a larger pore size.

It also means that, in comparison with a multilayer filter assembly structure, a much coarser filter, that might perhaps be employed as one of the intermediate layers rather than as the final layer, can be used instead, with equivalent results. This means greater economy because normally the finer the removal rating of the filter, the higher the cost.

The convoluted filter assembly of the invention has the additional advantage of an extended life because of a progressive but relatively uniform collection of contaminants. Contaminants tend to collect where the flow through the filter element composite is highest, or at any rate higher than at other portions of the filter surface. Consequently, in the filter assembly of the invention the contaminants tend to collect upon the first convolution fold encountered by the unfiltered flow, which may actually be the last convolution fold of the filter element composite at the end of the folded-over portion. As the contaminants collect there, this portion becomes progressively blocked, which reduces flow, while flow increases further along the filter element composite, at the next adjacent portion of the surface which is freer of collected contaminants. In this way, the contaminants are collected progressively along the surface of the convolutions, from one convolution to the next, and progressively block the filter composite from the first-encountered convolution fold towards the last-encountered convolution fold. Because the last-encountered portions of the filter surface remain relatively free of contaminants, compared to the first-encountered portions, until the entire filter surface is blocked, the progressive collection of contaminants may not result in a high pressure drop across the filter element until the filter element is practically fully blocked, and in addition, by the time the filter element is fully blocked, the collection of contaminants along its surface is relative uniform from the first convolution to the last, because of the progressive collecting action of each convolution fold in the series.

Inasmuch as in the filter structures of the invention the double layer is arranged in folds that are folded back and forth upon each other, all extending transversely across the line of flow, the configuration is different from the normal corrugated filter structure. To distinguish the structure of the invention from a normal corrugated structure, the folded filter element composite of the invention is referred to as convoluted, and the folds themselves are referred to as convolutions.

Accordingly, the filter assembly in accordance with the invention comprises a housing, a fluid inlet and a fluid outlet in the housing, each opening into a fluid chamber; and, disposed in the fluid chamber across the line of fluid flow from the inlet to the outlet so that all flow from the fluid inlet to the fluid outlet must pass therethrough, a filter element composite comprising a filter sheet material sandwiched between layers of foraminous spacer sheet material, the filter element composite having an upstream side and a downstream side and separating the chamber into a first portion on one side of the filter element composite communicating with the fluid inlet, and a second portion on the other side of the filter element composite communicating with the fluid outlet; the filter element composite being folded on itself in at least a double layer defining therebetween an open interior space in fluid communication with one of the first and second portions of the fluid chamber; the outer side of the filter element composite being in fluid communication with the other of the first and second portions of the fluid chamber; the double layer filter element composite being arranged in a plurality of convolutions extending transversely across the fluid chamber back and forth across the line of fluid flow from the fluid inlet to the fluid outlet, so that the fluid flow en route to the fluid outlet from the fluid inlet may pass at least twice across convoluted folds through the filter sheet from the upstream side to the downstream side thereof, between one portion of the fluid chamber and the space between the double layer of filter sheet material, and then in the opposite direction, back through the filter sheet between the space between the double layer of filter sheet material and the upstream portion of the fluid chamber.

Since the filter element composite is folded back and forth on itself, the assembly lends itself to utilization of a box housing in at least two portions and having a fluid chamber with two fluid ports, the filter element composite in convoluted form extending across the fluid chamber, held by the housing across the line of flow between the fluid ports, preferably with the convolutions supported in a fixed uniform spacing against differential fluid pressure and fluid flow.

Such a filter assembly is provided by Rosenberg U.S. Pat. No. 3,815,754, patented June 11, 1974, in a box shape in which the filter element in convoluted or corrugated sheet form is held at its sides in the housing, and can be built into the housing in this way because it is accessible during the bonding operations. This design includes means for closing off the access openings in the housing in a manner to ensure a fluid-tight seal between the housing and all sides of the filter element, so as to preclude any possibility of leakage past the filter element within the housing. The design lends itself to the use of plastic in all parts of the filter assembly, optionally including even the filter element itself, and also makes it possible to integrate the component parts of the disposable filter assembly into as little as one piece. The filter assembly can be made in mass production in large quantities, at low cost, so that the assembly can be considered as truly disposable after one use.

When the box design is to be used under relatively high fluid pressure differentials, and the convolutions are to be supported so that they are fixed against distortion and even collapse upon each other, the box filter design of Rosenberg U.S. Pat. No. 4,187,182 patented Feb. 5, 1980, may be used.

This design comprises, in combination, a housing comprising first and second housing portions assembled in a generally box-like configuration having two ends and at least four opposed sides defining therebetween a fluid chamber and at least two fluid ports; having outer side walls along the ends and two opposed sides, and having two sides open, at least two inner side walls spaced from the outer side walls and extending along said opposed sides; the filter element composite in convoluted sheet form extending across the fluid chamber across the line of fluid flow between the fluid ports and held in a fluid-tight seal extending the length of the inner side walls at opposed side portions of the filter element between an edge of the inner side walls and another portion of the housing; and side caps extending along the sides of the filter element and bonded in a fluid-tight seal thereto; the side caps, and inner side walls and housing portion together holding the sides and convolution folds of the filter element, positioning the filter element across the fluid chamber, supporting the folds against displacement in any direction, and sealing all the sides of the filter element to the housing, so that the fluid flow between the fluid ports must pass through the filter element.

In a preferred embodiment, the mating sections of the first and second housing portions engage and grip edge portions of opposed sides of the filter element. They can be integrated through the pores of the filter element in a fluid-tight seal, if desired, but this is unnecessary.

In a preferred embodiment, the filter assembly is a box cube, and substantially square-sided. However, any type of box shape can be used.

The first and second housing portions are open at their sides during assembly, until the side caps are put on, and so there is complete access to the interior of the mating sections. The sides of the filter element extending across the open sides are then closed off by side caps, which can be formed in situ, and bonded to the first and second housing portions across the openings. The sides of the filter element are easily sealed off by molding or potting the caps in situ using a hot-melt of a thermoplastic capping material. The result is that all sides of the filter element are sealed to the sides of the housing, on one set of opposed sides to the side caps, and on the opposed sides to the first and second housing portions, so that all fluid flow between the fluid ports must pass through the filter element.

If the box type of housing is not desired, the convoluted folds of filter element composite can be sealed off at each side edge, using adhesive, or a plastic side seam seal, so as to form a pouch in the selected number of convolutions.

Two preferred embodiments of the convoluted filter assembly of the invention are shown in the drawings, in which:

FIG. 1 represents a longitudinal cross-section through one embodiment of a filter assembly in accordance with the invention in which the filter element composite is in the form of a convoluted pouch;

FIG. 2 represents an end view taken along the line 2—2 of the filter element of FIG. 1 and looking in the direction from the fluid inlet toward the fluid outlet;

FIG. 3 represents an end view taken along the line 3—3 of the filter element of FIG. 1 and looking in the direction from the fluid outlet toward the fluid inlet;

FIG. 4 represents an exploded view of a box filter in accordance with the invention, showing the component parts prior to assembly, including the two housing portions, the filter element in sheet form, and the two side caps;

FIG. 5 represents a side view, partly in section, of the filter assembly of FIG. 4; and FIG. 6 represents another side view, partly in section, of the filter assembly of FIG. 4, looking towards one of the side caps.

The filter assembly shown in FIGS. 1 to 3 comprises a housing in two bell-shaped parts 1, 2, each part having a peripheral flange 3, 4 and fluid line connection 5, 6. One of the line connections serves as a fluid inlet, in this case 6, and one as a fluid outlet, in this case 5. The flanges are bonded or fusion-welded together at their abutting surfaces in a leak-tight seal. Sealed in the joint at its periphery is a single sheet of filter material 7, for example a nylon membrane or a polyester fabric of the type described in U.S. Pat. No. 3,701,433 having a pore opening of between 20 and 50 microns. The sheet 7 is sandwiched between spacer layers 8, 9 of extruded plastic netting such as Vexar, the three layers constituting a filter element composite 10. The filter sheet composite is looped in a double layer folded in a series of six convolutions 11, 12, 13, 14, 15, 16, with a space 17 within the double layer, between each facing layer. It will be noted that this space 17 is in flow communication with the filter chamber 18 on one side of the filter element composite, and thus with the line 5, while the outer side of the convoluted composite is in flow communication with the filter chamber 19 and thus with the line 6.

As seen in FIGS. 2 and 3, the composite has a flat surface, and the side edges 21, 22 of the composite are sealed in a leak-tight seal by a sealing strip or adhesive compound in a side seam seal in a box filter structure rather similar to that described and claimed in U.S. Pat. No. 4,187,182 patented Feb. 5, 1980 to David Rosenberg, so as to form a convoluted pouch, in communication on the inside of the pouch via space 17 with chamber 18 and the fluid outlet 5, and on the outer side of the pouch with chamber 19 and fluid inlet 6.

In operation, fluid enters the inlet 6 and chamber 19. Part flows alongside the filter composite, while part flows across the filter element composite at convolution 16 into space 17a. This is now filtrate flow. Part of this flows along the composite space 17a to space 17b of convolution 15, but part flows directly back across the filter element composite into space 19a, a part of chamber 19. Here, the filtrate flow joins unfiltered flow from chamber 19, and both cross the filter composite of convolution 15, entering the space 17b. Again, part of the filtrate flow follows space 17b into space 17c of convolution 14, while part flows back across the filter element composite into space 19b. Here, it joins unfiltered flow from chamber 19 and passes through the filter composite at convolution 14 into space 17c. This process is repeated for space 19c, convolution 13, and space 17d; space 19d, convolution 12, and space 17e; space 19e, convolution 11 and space 17f; and space 19f. It will thus be seen that the fluid flow can pass back and forth across the filter composite for up to thirteen times, which gives a considerably better particle removal rating than merely once, as in conventional corrugated filter elements of the same pore size.

Generally speaking, assuming the filter element to have a nominal removal rating of 40μ, when folded and convoluted in the structure shown in FIGS. 1 to 3, and when filtering 20μ particles, 50% of the particles will be removed by one passage through the filter material; the second passage through will take 50% of the remaining particles. For n passages, removal is $1-(0.5)^n$, i.e., for 4 passages, $1-(0.5)^4=0.938$. For 4 passages, the efficiency has been improved from 50% to 93.8%. Now let us say that half the blood passes through 4 layers in series and half through only one layer. Efficiency=$(0.5+0.938)/2=0.72$ 72%; close to 50% improvement in efficiency, and this is obtained without an increase in pressure drop.

The filter assembly of FIGS. 4 and 6 is composed of a molded plastic housing 20 having first and second housing portions 20A and 20B defining a fluid chamber 24 therewithin. A fluid line 25 is at the base of housing portion 20A, and a fluid line 26 is at the base of housing portion 20B. It will be seen that these lines are coaxial. One line serves as a fluid inlet and the other as a fluid outlet; fluid flow can be from either direction since the filter element composite 30 is a convoluted sheet whose opposite sides are the same, but is preferably from line 26 as inlet to line 25 as outlet.

Housing portion 20A has opposed sides 28 and 28' extending outwardly from the base portion 29, and housing portion 20B has opposed sides 32 and 33 extending outwardly from base portion 34. Each of sides 28, 28' of portion 20A terminates in an outwardly extending flange 35, and each of sides 32, 33 of portion 20B terminates in an outwardly extending flange 36. Each flange 35 has two sets of single ribs 37, 38, and each flange 36 has one single rib 39 and one double rib 40 with a slot 44 therebetween, into which ribs 37 fit. The ends 42, 43 of the filter element composite 30 are engaged by ribs 37, 40 and so retained in position. The ribs 38, 39 are bonded together to hold the housing portions together at the flanges 35, 36 as one piece. Such a bond can be obtained, for example, by ultrasonic welding, by solvent softening, or by heat fusion.

The open sides of housing portions 20A, 20B are closed off by end caps 45, 45', of which 45 is seen in FIG. 6, which are bonded to housing portions 20A, 20B along their sides 22a, 23a, 22b, 23b as seen in FIG. 4. In this way two of the four sides of the filter element composite 30 are sealed to the side caps, and two are held in the bite between ribs 37, 40 of the housing parts. This closes off all four side edges of the filter element composite to fluid flow, and restricts flow between the two portions of the fluid chamber 24 in the housing to that via the pores of the filter element composite 30. Thus, all flow between the fluid ports 25 and 26 of the housing 21 must pass through the filter element composite.

The filter element composite has a filter element 30a sandwiched between sheets 30b, 30c of extruded polypropylene mesh, such as Vexar.

The filter element 30a can be of any filter sheet material. The element shown is made of microporous plastic membrane sheet, such as nylon, cellulose actate or polypropylene membrane. Plastic or wire mesh, such as polyester mesh fabric, or stainless steel wire mesh, or epoxy-impregnated paper, or a supported nylon membrane, as well as other types of sheet filter element, can also be used. The filter element is a square sheet, in corrugated form, for an increased surface area in the limited space of fluid chamber 24.

The assembly of the box filter of FIGS. 4 to 6 is as follows: It will be seen on reference to FIG. 4 that the side sections 28, 28', 32, 33 of each housing portion 20A, 20B have a special construction which ensures a fluid-tight seal between the housing portions when they are bonded together. The flanges 35 of the opposed sides 28, 28' of housing portion 20A meet the flanges 36 of the sides 32, 33 of the other housing portion 20B. Flanges 35 of portion 20A have one pair of ribs 37, 38 and flanges 36 of portion 20B have one set of single ribs 39 and one set of double ribs 40 with opposing ribs 37 therebetween to ensure that the portions 20A, 20B fit snugly together in the correct position to hold the filter sheet 40 in place.

After portions 20A and 20B are fitted together, with ribs 37, 40 and 38, 39 abutting, the ribs 38, 39 are readily fused together to produce an integral one-piece structure at the seal 46 (FIGS. 5 and 6). Internally of the ribs 38, 39 are the ribs 37, 40, which retain the filter element ends in their bite.

In assembly, the convoluted filter element composite is slid into housing portion 20B with the ends 42,43 lapped over the flanges 36 over the ribs 40. Housing portion 20A is then fitted over the portion 20B, and pressed down smartly against the filter element composite, pinching the composite ends between the ribs 37, 40, holding the composite firmly in place by the tight engagement between the flanges 35, 36 of the housing portions 20A, 20B and the ribs 37, 40. The ribs 38, 39 are then integrated by ultrasonic welding, forming a fluid-tight seal therebetween, and closing off these two ends and the first convolution fold of the filter element composite to fluid flow.

Next, the side caps 45, 45' are formed in situ or preformed and bonded across the openings 48, 49 to the housing portions 20A and 20B, and to the filter element composite edges 52, 53, bonding the filter element composite sides to the side caps, and completing the fixing of the side edges of the filter element composite in place across the fluid chamber 24. This can be done using, for example, an adhesive or a melt or adhesive or resin, or a potting composition. The filter assembly is now complete, and ready for use.

The filter assembly is operated in line, as follows:

While fluid flow can be in either direction, it preferably enters the filter assembly at port 26 and proceeds into the portion of the filter chamber 24a that is upstream of the filter composite 30. It then encounters the convolution fold 30d of the filter element composite. Part of the flow passes through the composite of the fold into the interior space 55 between the folded-over sheet of filter element composite 30. Of the flow entering the space 55, part flows along the space 55 to the next convolution fold of the filter element composite, while part flows back through the filter element composite into the portion 24c of the chamber 24a, between that convolution fold and the next convolution fold. Part of the unfiltered fluid flow in the chamber 24a and part of this filtrate then pass through the filter element composite of this convolution fold into the space 55 within this fold, and so on, through all of the several convolution folds, down to the first one where the folded over portion of the filter element composite 30 begins, at the level of the flanges 35, 36.

The final filtering layer of filter element composite 30 extends across the chamber 24 between flanges 35, 36, separating the dividing upstream portion 24a from the downstream portion 24b of the filter chamber 24. The space 55 within the convolutions of the filter element composite opens into the downstream filter chamber portion 24b at the beginning of the folded-over portion of the filter element composite 30. The filtrate in chamber portion 24b exits from the filter assembly via port 25.

Line connections can be made at ports 25, 26 in any desired manner. For medical use, a standard blood spike and socket can be used.

The filter housing portions and side caps can be made of any synthetic plastic material. Thermoplastic or solvent-soluble plastic materials are preferred because of the ease of bonding, but it is also possible to use thermosetting resins in a thermoplastic, fusible, or heat-softenable stage of polymerization, until the bondings have been effected, after which the curing of the resin can be completed to produce a structure which can no longer be separated. Such a structure is autoclavable without danger of destroying the fluid-tight seal between the housing portions and the filter element composite and the side caps and the filter element composite. Thermoplastic resins whose softening point is sufficiently high so that they are not softened under sterilizing autoclaving conditions are preferred for medical use. Exemplary of the plastic materials which can be used are polyethylene, polypropylene, polybutylene, polyisobutylene, polyamides, polyvinyl chloride, polyvinylidene chloride, polyacrylonitrile, polyesters, polycarbonates, polymethyl methacrylate, polyallyl, and polyoxymethylene resins. Polytetrafluoroethylene and polytrifluorochloroethylene can also be used.

Any filter medium can be used as the filter element preferably in the form of a filter sheet. It is usually preferred for medical purposes that the pore size of the filter medium be less than 50 microns, and preferably less than 0.3 micron where the passage of bacteria through the filter assembly is to be prevented. Filter sheets which are incapable of passing bacteria include membrane filters and filter sheets described in U.S. Pat. Nos. 3,238,056, dated Mar. 1, 1966, 3,246,767, dated Apr. 19, 1966, 3,353,682, dated Nov. 21, 1967, and 3,573,158, dated Mar. 30, 1971, Pall et al.

Also useful are metallic filter sheet materials, such as woven or nonwoven wire mesh, for instance, stainless steel screen, and stainless steel wire mats. Metal filter sheets are readily bonded to plastic housing materials in a fluid-tight seal by fusion or potting techniques, or by use of adhesives.

The filter medium is composed of one or a plurality of filter sheets of the same or different pore size. The sheet or sheets are formed in a corrugated configuration, with at least one foraminous support and drainage member in corrugated supporting juxtaposition to the filter sheet and on one or on both sides of the filter sheet.

Two or more filter sheets placed in contact with each other are advantageous because occasional random defects may be present in the sheets. By placing two sheets face to face, the probability of two defects being superimposed on each other becomes remotely small.

The foraminous relatively rigid support and drainage member has a rigidity that is higher than the filter sheet, and sufficient strength to withstand encountered differetial fluid pressure across the filter sheet.

Suitable foraminous external and interior supports can be made of metal or plastic, and can be, for example, in the form of perforated sheets or plates, or woven or nonwoven or extruded netting, made of plastic filaments or extrusions. The preferred foraminous sheets are made of extruded netting of synthetic resinous material. Any thermoplastic synthetic resinous material can be employed, such as polyethylene, polypropylene, polybutylene, polystyrene, polyamide, cellulose acetate, ethyl cellulose, cellulose acetate butyrate, copolymers of vinyl chloride and vinyl chloride and vinyl acetate, polyvinyl chloride, polyvinylidene chloride, vinylidene chloride-vinyl chloride copolymers, polyvinyl butyral, polytrifluorochloroethylene, polymethyl methacrylate, and synthetic rubbers.

Extruded plastic netting is available in a variety of patterns. In some, the plastic has an open weave pattern, with the extruded netting links in one direction having the same diameter as the extruded links in the other. Others have the extruded links wider in one direction than in another, forming ribs extending lengthwise, or crosswise, or circumferentially, of the netting. Netting generally is preferred in which the extruded links are of uniform diameter, or, if one is of larger diameter than the other, the larger diameter extrusions run circumferentially of the netting, so as to minimize blockage of the convolutions or corrugations of a corrugated filter element. Extruded nettings also are available having diagonal patterns with the openings tetragonal, and in other cross-diagonals are bisected by longitudinal extrusions forming triangular openings. Any of these can be used.

Nonwoven materials, called "spun-bonded", can be prepared by laydown of extruded thermoplastic synthetic resin filaments while still soft in the form of a nonwoven mat. The soft fibers adhere to one another, and when cooled form an integral mass of nonwoven filamentary structure. This technique is applicable to glass fibers, to polyamides, and to other thermoplastic fibers.

Nettings also are formed from extruded thermoplastic resin sheet, which is embossed during or after extrusion and then stretched to open holes in the embossed areas, resulting in the formation of a netting in sheet form.

Perforated sheet also can be used. In this case, elongated perforations can be punched or machined in the sheet or formed by application of heat localized to the areas to be perforated.

Spun-bonded nonwovens can also be prepared by laying down two types of fibers as a nonwoven mat, one fiber being lower melting and present in small proportion. When the web is heated to above the softening point of the one fiber, it becomes firmly bonded. This technique is applied commercially to polyester fibers.

Support and drainage members can be put on one or both sides of the filter sheet or sheets, or sandwiched between filter sheet layers. The composite is then corrugated, to the desired number and depth of corrugations. In this way, the corrugations of the support and drainage members match the corrugations of the filter sheet, and these sheets are in corrugated supporting juxtaposition to the filter sheets.

The box filter assemblies of the invention can have any number of sides, conforming to the circumferential configuration of the filter sheet. The filter sheet is preferably square or rectangular, but it can be any straight-sided polygonal shape, including triangular, hexagonal, pentagonal, and octagonal. The housing embodiments shown in the drawings thus are four-sided boxes for square or rectangular filter elements, and this is the simplest and the preferred configuration. However, pentagonal, hexagonal, heptagonal, and octagonal and higher polygonal box configurations are possible.

The filter assemblies of the invention have wide medical uses, and can be used, for example, in the filtration of blood, in blood transfusions, and in extracorporeal transfusion operations, where the blood must be circulated through a filter before being returned to the body. The filters can be used in lines administering fluids and gases of all sorts to a patient, such as, for example, a breathing filter to isolate the patient from an inhalation therapy apparatus, and in the filtering of fluids for intravenous administration, as well as any use where a small extended area disposable filter is needed with a substantial filter surface in a small space.

Having regard to the foregoing disclosure, the following is claimed as the inventive and patentable embodiments thereof:

1. A convoluted plural layer filter assembly comprising a housing; means defining a fluid inlet and a fluid outlet in the housing, each opening into a fluid chamber; and, disposed in the fluid chamber across the line of fluid flow from the inlet to the outlet so that all flow from the fluid inlet to the fluid outlet must pass therethrough, a filter element composite comprising a filter sheet material sandwiched between layers of foraminous spacer sheet material, the filter element composite having an upstream side and a downstream side and separating the chamber into a first portion on the upstream side of the filter element composite communicating with the fluid inlet, and a second portion on the downstream side of the filter element composite communicating with the fluid outlet; the filter element composite is folded on itself as a double layer and the double layer is folded on itself in a plurality of convolutions, defining between the layers throughout the convolutions an open intercommunicating interior space in fluid communication with one of the first and second portions of the fluid chamber, the other side of the layers of the filter element composite throughout the convolutions is in fluid communication with the other portion of the fluid chamber; the plurality of convolutions extending transversely across the fluid chamber, back and forth across the line of fluid flow from the fluid inlet to the fluid outlet, so that the fluid flow in route to the fluid outlet from the fluid inlet may pass at least three times across convoluted folds through the double layers of the filter sheet material, between the open interior space and the space on the other side of the double layers, once forward from the upstream side to the downstream side thereof, through the space between the double layer of filter sheet material, and thence backward through the filter sheet from the downstream side to the upstream side thereof, and then forward through the filter sheet from the upstream side to the downstream side thereof.

2. A convoluted plural layer filter assembly in accordance with claim 1, in which the housing is in two mating housing portions which engage and grip opposed sides of the filter element composite, and which are integrated in a fluid-tight seal.

3. A convoluted plural layer filter assembly in accordance with claim 1, in which the housing is a rectangular box.

4. A convoluted plural layer filter assembly in accordance with claim 1 in which the housing is in two dome-shaped parts bonded together with the filter element composite therebetween.

5. A convoluted plural layer filter assembly in accordance with claim 1, wherein the housing is a box having six sides, and having side caps attached thereto; four opposed sides being defined by the housing, and two opposed sides being defined by the side caps attached thereto, and the filter element composite is in sheet form having two sides and two ends, each end being sealed in a fluid-tight seal to one of the opposed sides of the housing and each side being sealed in a fluid-tight seal to one of the opposed end caps.

6. A convoluted plural layer filter assembly in accordance with claim 1, in which the fluid inlet and outlet are coaxial.

7. A convoluted plural layer filter assembly in accordance with claim 1, in which the filter element has a pore size of less than 50 microns.

8. A convoluted plural layer filter assembly in accordance with claim 1, in which the filter element has a pore size of less than 0.3 micron.

9. A convoluted plural layer filter assembly in accordance with claim 1, in which the housing is of plastic material.

10. A convoluted plural layer filter assembly in accordance with claim 9, in which the plastic material is a thermoplastic resin.

11. A convoluted plural layer filter assembly in accordance with claim 10, in which the thermoplastic resin is polypropylene.

12. A convoluted plural layer filter assembly in accordance with claim 1, in which the housing is formed in two cooperating sections, each section defined by an outer side wall terminating in flanges, the inlet is in one section and the outlet is in the other section, and the sections are attached together at the flanges, thereby forming a one-piece housing.

13. A convoluted plural layer filter assembly in accordance with claim 12, in which the filter element is held at opposed end portions between the side walls.

14. A convoluted plural layer filter assembly in accordance with claim 12, in which the filter element is held to the housing sections in a bite between ribs on the flanges thereof.

* * * * *

UNITED STATES PATENT AND TRADEMARK OFFICE
CERTIFICATE OF CORRECTION

PATENT NO. : 4,479,874
DATED : October 30, 1984
INVENTOR(S) : David J. Rosenberg et al It is certified that error appears in the above-identified patent and that said Letters Patent are hereby corrected as shown below:

Column 5, line 3 : before "opposed" insert --other--
Column 6, line 33 : after "0.72" insert -- =O= --
Column 7, line 13 : "actate" should be --acetate--
line 17 : "element" should be --elements--
Column 8, line 62 : before "Pall" insert --to--
Column 9, lines 14 and 15: "differetial" should be --differential--

Signed and Sealed this

Twenty-fourth Day of December 1985

[SEAL]

Attest:

DONALD J. QUIGG

Attesting Officer  Commissioner of Patents and Trademarks